Oct. 11, 1960

L. M. GARY 2,955,832

SLEEVE FOR TAPER SHANK TOOLS

Filed July 11, 1958

Lonnie M. Gary, Inventor,

By John H. Leonard, his Attorney.

United States Patent Office 2,955,832
Patented Oct. 11, 1960

2,955,832
SLEEVE FOR TAPER SHANK TOOLS

Lonnie M. Gary, Cleveland, Ohio, assignor to Norman Noble, Inc., Cleveland, Ohio, a corporation of Ohio Filed July 11, 1958, Ser. No. 747,880
7 Claims. (Cl. 279—103)

This invention relates to a sleeve for taper shank tools such as chucks, grinding wheels, drills, and the like, which are adapted to be held in a rotary spindle or a tail stock of a machine tool for securing the tool in fixed position relative to the spindle or tail stock in which the sleeve is inserted.

For the purpose of illustration, the invention is described hereinafter as applied to a tapered drill sleeve for tapered shank drills, its use in connection with other tools being readily apparent from the illustrative example.

Sleeves for this purpose are well known in the art. A typical sleeve comprises a hollow body which is open at one end and which, at the other end, carries a driving tang. The body has a socket, the peripheral wall of which is frusto-conical and tapers from the open end of the body toward the tang end. The body also has an exterior peripheral wall which is also frusto-conical, tapers from adjacent the open end of the body toward the tang end, and is coaxial with the peripheral wall of the socket.

A sleeve of this character is received in a corresponding tapered bore or socket of a spindle, tail stock or other holder so as to be frictionally held in fixed circumferential position relative to the socket in which it is received, and, in turn, receives an additional sleeve or the shank of the tool so as to hold the sleeve or tool shank frictionally in fixed circumferential position relative to the sleeve.

Generally, such a sleeve includes transversely extending aligned tang slots through which a drift pin can be driven to strike the end of the tang of a tool shank accommodated in the sleeve, so as to disengage the shank from the sleeve.

Originally, such sleeves were made of metal and most are today. However, the metal sleeves are open to certain objections. In the first place, there is the matter of wear of the sleeve, tool shank, and holder.

Another disadvantage resides in the fact that a metal sleeve, if broken or damaged in any way, tends to score either the tool shank or the spindle or tail stock in which the sleeve is accommodated.

Again, it sometimes happens that small particles of foreign matter within the spindle or tail stock in which the sleeve is received, or on the surface of the socket or shank wall, sometimes cause slight misalignment of the sleeve, holder, and tool; or scratching of the tapered walls.

Under the impact of sudden shocks, metal sleeves are apt to hold the tool so firmly by the shank, and, itself, be held so firmly in the spindle or tail stock, that damage results to some part of the equipment, tool, or sleeve. Fracturing of the sleeve usually results in scoring of the spindle or tool stock bore.

To overcome some of these difficulties, a sleeve of like shape but made of synthetic plastic material, such as the formaldehyde resins and other thermal setting and thermoplastic materials, the material known as "Bakelite" being one example, became available on the market several years ago. These prior plastic sleeves do not scuff and score the complementary surfaces of the tool shank or the spindle or tail stock into which the sleeves are inserted. Furthermore, they have a certain amount of resiliency and become frictionally released and slip and rotate relative to the tool shank or spindle, and therefore relieve the shock on the tool shank, spindle, or tail stock, thus preventing damage to the tool and machine. Also, due to a limited yieldability, very small particles which might misalign a steel sleeve or cause scratches when moved under pressure thereby, can partially or wholly embed in the surface of the more yieldable, resilient plastic sleeve and thus not cause misalignment or scratches.

However, these prior plastic sleeves, in turn, introduced certain difficulties. They were difficult to loosen and remove from a tail stock, spindle, holder bore, or other sleeve due to the driving tang being too yieldable and inadequate, and easily damaged by the drift pin. Furthermore, they do not always fit with the precision desired.

In accordance with the present invention, the plastic sleeves of the prior art have been modified and improved so as to retain their advantages while also obtaining the advantages which, heretofore, were present only in connection with the metal sleeves, and so as to obtain combined advantages which were not present in either type of prior structures.

Various other objects and advantages of the present invention will become apparent from the following description, wherein reference is made to the drawings, in which Fig. 1 is a side elevation of a sleeve embodying the principles of the present invention, part thereof being shown in section for clearness in illustration;

Figures 1, 2:
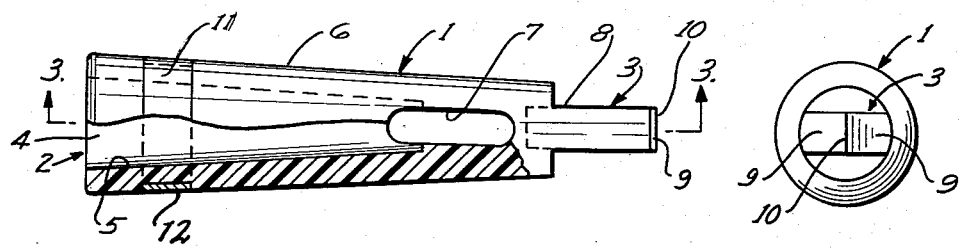
Fig. 2 is a right end elevation of the sleeve illustrated in Fig. 1.

Referring to the drawings, the sleeve comprises an elongated body, indicated generally at 1, and having an open end 2 at one end and a driving tang 3 at the other end. The body is provided with a socket, indicated generally at 4, which extends from the open end toward the tang end 3. The socket 4 has a peripheral wall 5 which is frusto-conical and tapers from the open end toward the tang end of the body. The body has an exterior wall 6 which is frusto-conical and tapers from the open end toward the tang end and is coaxial with the wall 5.

The body is provided with the usual tang slots 7 through which a drift pin can be driven for striking the tang of a tool shank which is accommodated in the socket 4 when a tool shank is mounted in the sleeve in the usual manner.

In accordance with the present invention, the body is composed of a non-metallic plastic material which preferably is one which is tough and relatively rigid. Materials such as nylon, zylon, and polyethylene may be used, but the specific material is relatively unimportant except that it should be somewhat resilient yet have sufficient rigidity for its intended purpose.

The driving tang of the body includes a rigid insert 8 which is of material which is harder and less resilient than the material of the body 1. In the form illustrated, the insert 8 is made of metal. This insert 8 is embedded in the body 1 and bonded thereto by molding the plastic material of the body thereabout, as illustrated. At the outer end of the tang 3, the insert 8 is provided with wedge faces 9 which face endwise of the body 1, are bias to the common axis of the walls 5 and 6, and intersect in a peak 10. The faces 9 of the insert 8 are preferably hard and wear resistant, being specifically treated if desired. Usually, they are exposed through the end of the body or tang, but, in some instances, a slight film of the plastic material overlies them. In either event, they add sufficient rigidity to the driving tang as a whole and a sufficient resistance to compression to any overlying film of the plastic on the faces 9 that the sleeve can readily be disengaged from a spindle, tail stock, or supporting sleeve, by engaging the surfaces 8 or 9 of the driving tang with a drift pin in the usual manner through the usual tang slot in the spindle, tail stock, or supporting sleeve.

In order to assure precise concentricity of the sleeve with a spindle or tail stock, an accurate radial dimensioning of the sleeve at the most critical location along its length, an annular insert 11 is provided near the open end 2 of the body 1. The insert 11 is coaxial with the socket 4 and the surface of the exterior peripheral wall 6.

The outer surface 12 of the insert preferably is exposed at the outer surface of the body 1 so as to form a continuation of said surface.

The annular insert 11 preferably is located so that a point midway between its ends lies about 5/8 of an inch from the open end of the sleeve or body 1. Its length is about one quarter to one half an inch. This positioning is desirable because it is at this location that the measurement for spindles and tail stocks for accuracy in centering is taken and it is desirable that the present sleeve accurately fit this particular portion of the spindle or tail stock.

The present sleeve is used in the same manner as the sleeves heretofore provided, the essential novelty lying in the provision of the metallic driving tang and the metallic annulus 11.

The present sleeve has the advantages of the prior plastic sleeves in that it does not scuff the complementary surfaces of the spindles, tail stock or other sleeves when it is inserted, and is not scuffed by tools or when the tools are inserted in it. At the same time, there is a certain resiliency so that the sleeve can yield and relieve and cushion shocks on the tool and machine. The sleeve can be destroyed without destroying or scoring the complementary surfaces with which its surfaces are engaged, and without damaging the tool or the equipment but, in fact, slipping and yielding before sufficient stresses are produced to cause deterioration or damage to the other parts of the equipment.

By virtue of the annular insert, precise accuracy in the fit of the sleeve in a cooperating socket of a tail stock, spindle or another sleeve, is obtained. At the same time, the yieldability of the sleeve is retained. Again, a firm driving tang is provided which can cause release of the sleeve from a socket in which it is seated, yet which is not easily damaged or apt to be broken off by the usual drift pin and the like.

Furthermore, the sleeve is such that it does not scuff the surfaces with which it engages. As to small particles of foreign material which may be on the surfaces, such generally embed in the sleeve sufficiently so that they do not cause misalignment of the sleeve relative to the spindle or tail stock, or scratching thereof.

Figure 3:
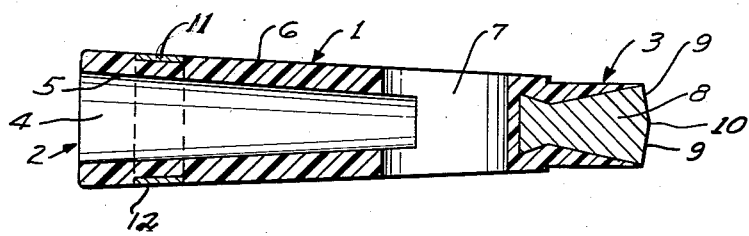
Fig. 3 is a vertical longitudinal sectional view taken on the line 3—3 in Fig. 1, part thereof being shown in elevation.
Figure 4:
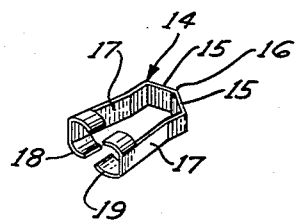
Fig. 4 is a modified form of an insert used in the present invention.

Referring next to Fig. 4, an insert 14 which may be used instead of the insert 8 is illustrated. The insert 14 comprises a sheet metal stamping having base portions 15 sloping outwardly at an angle from their intersection at 16 and thus corresponding to the portions 9 and intersection 10 of the insert 8. Leg portions 17 extend from the outer ends of the base portions 15. On the free ends of the legs 17 are ears, such as indicated at 18 and 19, for increasing the bond of the insert 14 to the body 1. The insert is disposed in the body in the same position as the insert illustrated in Fig. 3, that is, so that the surfaces 15 occupy the same position as the surfaces 9 of the insert 8. The insert 14 thus functions in like manner to the insert 8.

Having thus described my invention, I claim:

1. A tapered sleeve for holding tools and comprising a substantially hollow body open at one end and having an internal and external coaxial frusto-conical walls tapering in a direction away from the open end toward the opposite end of the body, said internal wall defining a tool holding socket, said body being composed of non-metallic, moldable, relatively rigid, resilient, plastic material, an insert of relatively more rigid material embedded in and bonded to the body and having a hard, wear-resistant, end wedging face disposed at said opposite end of the body and facing endwise of the body away from the open end, and positioned bias to the axis of said walls.

2. A sleeve according to claim 1 wherein said insert is metal, and said wedging face is exposed exteriorly of the body at said opposite end.

3. A sleeve according to claim 1 wherein, near the open end, an annular insert of material relatively more rigid than the material of the body is embedded in the body in coaxial relation to said frusto-conical surfaces.

4. A sleeve according to claim 3 wherein said annular insert has a frusto-conical outer surface coaxial with, and forming a portion of, the external frusto-conical surface of the body.

5. A sleeve according to claim 4 wherein said annular insert is metal.

6. A tapered sleeve comprising a substantially hollow body open at one end and having coaxial internal and external coaxial frusto-conical walls tapering in a direction away from the open end toward the opposite end of the body, said body being composed of non-metallic, moldable, relatively rigid, plastic material, an annular insert embedded in, and bonded to, the body near the open end of the body and in coaxial relation to the frusto-conical walls thereof.

7. A tapered sleeve according to claim 6 wherein the annular insert has a frusto-conical outer peripheral wall surface which is coaxial with, and forms a portion of, the external frusto-conical surface of the body 5.

References Cited in the file of this patent

UNITED STATES PATENTS

| 2,459,598 | Stott | Jan. 18, 1949 |
| 2,622,949 | Cotchett | Dec. 23, 1952 |
| 2,780,469 | Hull | Feb. 5, 1957 |
| 2,804,290 | Kaufman | Aug. 27, 1957 |
| 2,879,069 | Swanson | Mar. 24, 1959 |

FOREIGN PATENTS

| 561,165 | Great Britain | May 8, 1944 |